March 28, 1961 J. A. MISCOVICH 2,976,886
HYDRAULIC CONTROL APPARATUS
Filed Nov. 4, 1957 3 Sheets-Sheet 1
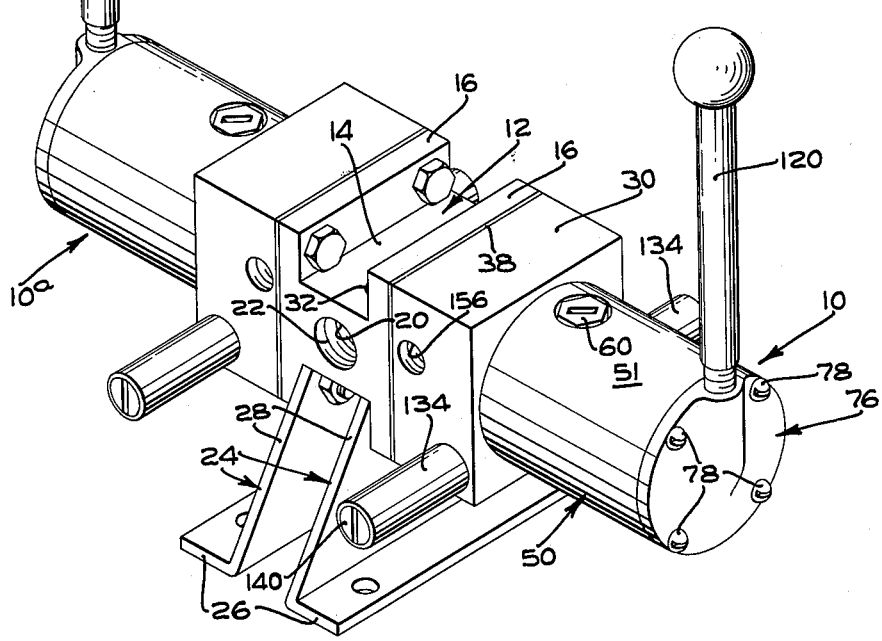
FIG_1
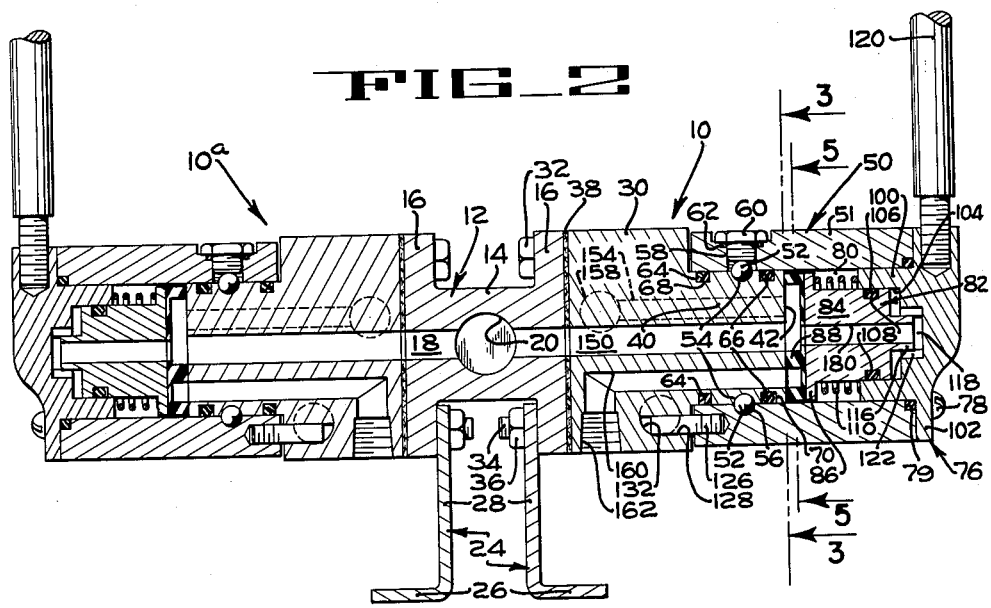
FIG_2
INVENTOR
JOHN A. MISCOVICH
BY Hans G. Hoffmeister
ATTORNEY March 28, 1961    J. A. MISCOVICH    2,976,886
HYDRAULIC CONTROL APPARATUS
Filed Nov. 4, 1957    3 Sheets-Sheet 2
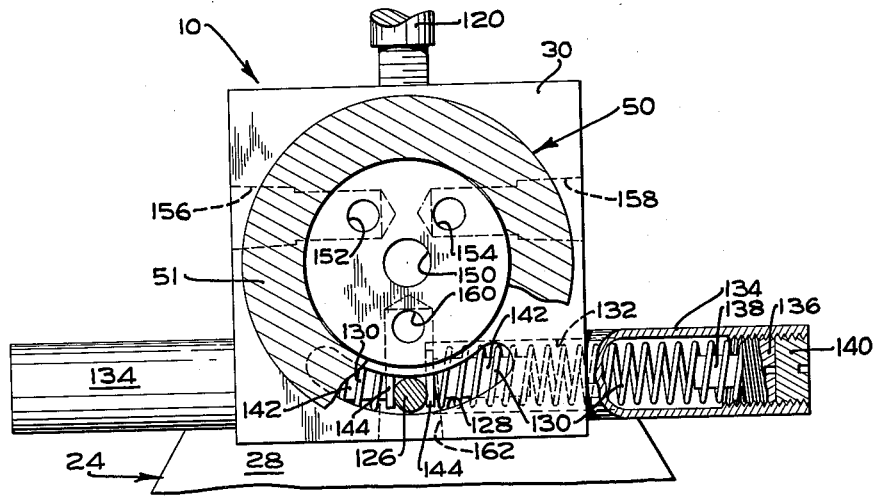
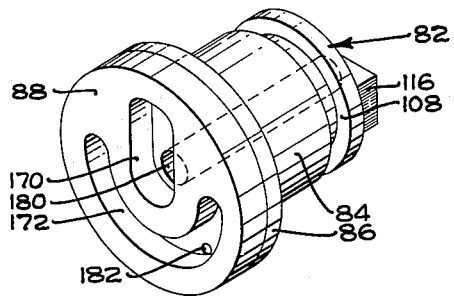
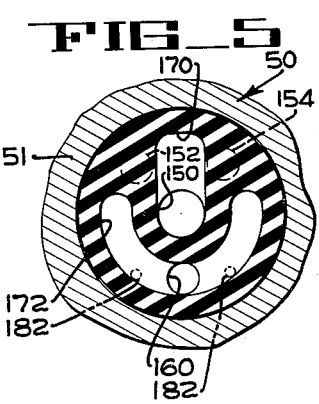
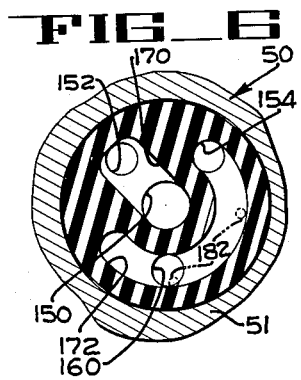
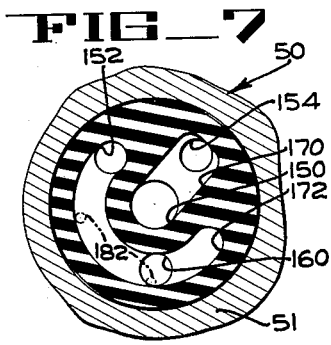
INVENTOR
JOHN A. MISCOVICH
BY *Hans G. Hoffmeister*
ATTORNEY

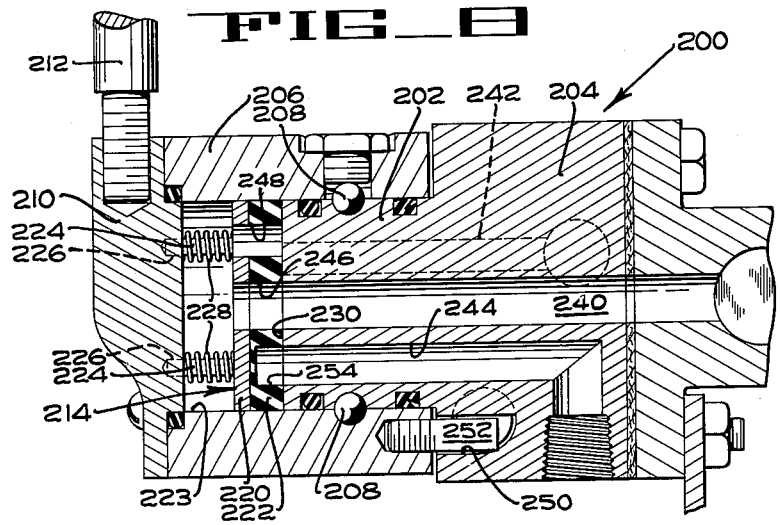
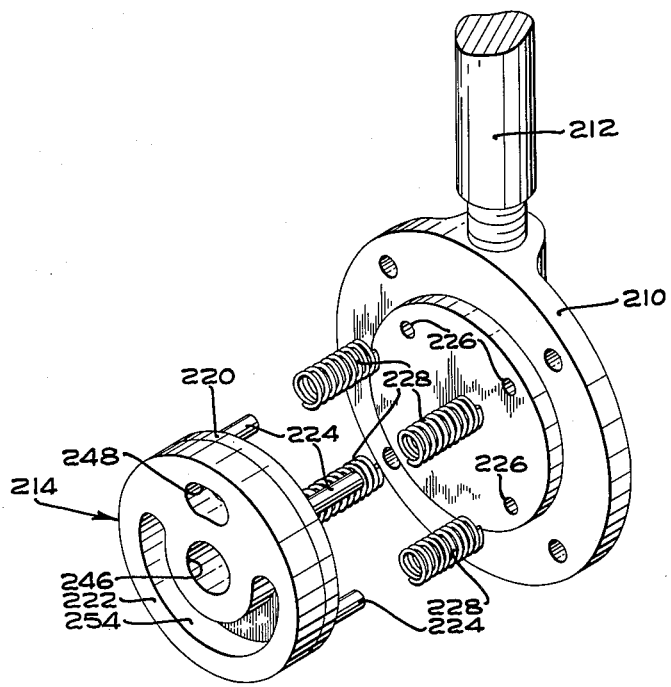

United States Patent Office 2,976,886
Patented Mar. 28, 1961

2,976,886

HYDRAULIC CONTROL APPARATUS

John A. Miscovich, Fairbanks, Alaska, assignor, by mesne assignments, to John A. Miscovich, Los Angeles, Calif., and Paul E. Fillio and J. M. Gaunlett Co. Inc., a corporation of Washington, both of Seattle, Wash.

Filed Nov. 4, 1957, Ser. No. 694,245

4 Claims. (Cl. 137—624)

This invention appertains to hydraulic valves and relates more particularly to rotary valves for controlling the supply of motivating fluid to reversible hydraulically operated machines.

An object of the invention is to provide an improved hydraulic valve.

Another object is to provide an improved rotary valve for controlling flow of fluid.

Another object is to provide a rotary valve especially adapted to handle fluid at high pressure.

Another object is to provide a hydraulic valve of the rotary type wherein the pressure of the valve core against its seat is derived in part from the hydrostatic pressure of the fluid handled by the valve so that the valve core pressure varies in accordance with variation in the hydrostatic pressure.

Another object is to provide a valve for controlling flow of fluid under high pressure, which valve requires but minimum effort for its operation and is therefore well suited for use in connection with manually controlled apparatus.

Other objects of the invention will become apparent from the following description and the accompanying drawings in which:

Fig. 1 is a perspective of two of the hydraulic valves of the invention mounted in tandem on a common manifold block.

Fig. 2 is a vertical axial section of the valves and manifold block of Fig. 1.

Fig. 3 is an enlarged section along lines 3—3 of Fig. 2, certain parts being broken away.

Fig. 4 is a perspective of the valve core constituting a component of the valve shown partially in Fig. 3.

Figs. 5, 6, and 7 are fragmentary sections along lines 5—5 of Fig. 2 and showing the relationship of the valve core to the valve seat in different operating positions.

Fig. 8 is a vertical axial section partly broken away of a modified form of the hydraulic valve of the invention.

Fig. 9 is an exploded isometric showing some of the components of the valve of Fig. 8.

Fig. 1 illustrates two valves of the present invention at 10 and 10a, respectively, mounted in tandem upon a common manifold block 12, thus disposing the two valves so closely together that they can conveniently be operated either simultaneously or otherwise by one person. This arrangement adapts the valve particularly for use in connection with apparatus that is moved in opposite directions by each of two independently operable hydraulic engines. An example of such an apparatus for the control of which the valves 10 and 10a are well suited when arranged in the tandem mounting of Fig. 1, is the Automatic Hydraulic Giant forming the subject matter of U.S. Patent 2,680,650, issued to Miscovich on June 8, 1954.

The manifold block 12 (Figs. 1 and 2) comprises a central body portion 14 having a mounting flange 16 at each end. A fluid supply duct 18 extends axially through the manifold block 12 and is open at its ends in the outer faces of the flanges 16. Fluid under suitable pressure is supplied to the duct 18 through a lateral branch duct 20 opening at its outer end at a side face of the body portion 14 of the block 12 and suitable means such as threads 22 are provided in association with the branch duct 20 for connecting a fluid pressure supply conduit to the same.

The manifold block 12 is supported by preferably a pair of brackets 24, each of which comprises a horizontal foot flange 26 and a vertical flange 28 secured to the inner face of one of the mounting flanges 16 of the manifold block 12.

Inasmuch as the two valves 10 and 10a of Figs. 1 and 2 are of identical construction, the purposes of the present disclosure will be served by the following description of only the valve 10. The valve 10 comprises a rectangular base 30 (Figs. 1 and 2) rigidly secured to one of the mounting flanges 16 of the manifold block 12 by cap screws 32 extending through the upper part of the flange 16 and studs 34 extending through the lower part of the flange 16 and having nuts 36 threaded thereon. A suitable gasket 38 is interposed between the flange 16 and the base 30. The studs 34 and nuts 36 likewise serve to secure the associated mounting bracket 24 to the manifold block.

The stationary body portion 40 (Figs. 2 and 3) of the valve 10 is in the form of a cylindrical boss projecting from the outer face of the base 30 and terminating in a flat end face 42, the plane of which is perpendicular to the axis of the cylindrical valve body 40. A valve core housing 50 in the form of a cylindrical sleeve 51 is rotatably mounted upon the cylindrical valve body 40 by means of a series of ball bearings 52 (Fig. 2) engaged within cooperating races or grooves 54 and 56 in the valve body 40 and in the inner surface of the sleeve 51, respectively. An access opening 58 extends through the wall of the sleeve 51 and intersects the ball race 56 to permit insertion of the ball bearings 52 after the sleeve 51 has been assembled onto the valve body 40. A plug 60 is threaded into the access opening 58 to retain the ball bearings 52 in operative position and a sealing gasket 62 compressed under the head of the plug 60 assists in retaining lubricant within and excluding dust and other detrimental material from the ball races 54 and 56. Annular fluid seals 64 and 66 are seated within the annular grooves 68 and 70, respectively, in the cylindrical surface of the valve body 40 and establish sliding fluid sealing engagement with the inner surface of the sleeve 51. The seal ring 64 protects the ball bearings 52 from dust and the like which otherwise might enter the ball races from without the valve while seal ring 66 isolates the ballbearings 52 from the hydraulic fluid within the valve 10.

The sleeve 51 projects axially beyond the end face 42 of the valve body 40 and is closed at its outer end by an end plate 76. A plurality of screws 78 secure the end plate 76 to the sleeve 51, and consequently the end plate 76 constitutes a part of the valve core housing 50. A sealing ring 79 prevents leakage between the sleeve 51 and the end plate 76. The sleeve 51 is of such length that a substantial part of its bore remains between the end face 42 of the valve body and the outer end of the sleeve. This part of the sleeve's bore that is not occupied by the valve body 40 constitutes a valve chamber 80 (Fig. 2) within which a valve core 82 is disposed. The valve core 82 comprises a cylindrical body portion 84 of substantially less diameter than the bore of the sleeve and a head 86 whose diameter is greater than that of the body portion 84 but which is sufficiently less than the inside diameter of the bore of the sleeve to permit the valve core 82 to float freely within the valve chamber 80.

A resilient disc 88 of rubber or rubber-like material is bonded to the terminal face of the head 86 and slidably engages the end face 42 of the valve body 40.

The end plate 76 includes a cylindrical part 100 fitted into the bore of the sleeve 51 and a flange 102 on the outer end of the cylindrical part 100 adapted to engage the terminal end of the sleeve 51. A cylindrical bore 104 in the inner end of the cylindrical part 100 of the end plate 76 opens into the valve chamber 80 and provides a hydraulic cylinder into which the cylindrical body portion 84 of the valve core 82 is fitted. A seal ring 106 seated within an annular groove 108 in the outer surface of the valve core body portion 84 establishes a sliding fluid tight seal with the wall of the hydraulic cylinder 104. A coil spring 110 under compression between the back of the head 86 of the valve core 82 and the inner end of the cylindrical part 100 of the end plate 76 urges the resilient disc 88 of the valve core into engagement with the end face 42 of the valve body 40.

The valve core 82 is connected to the end plate 76 for rotation therewith but in a manner that permits axial movement of the valve core 82 within the valve chamber 80. For this purpose a diametrically extending rib 116 (Figs. 2 and 4) is provided on the outer end of the valve core 82. The rib 116 seats within a diametrically extending groove 118 in the end plate 76 at the bottom of the hydraulic cylinder 104 thereof, thus keying the valve core 82 to the valve core housing 50 for rotation therewith. A radially extending handle 120 rigidly secured to the end plate 76 provides means for manually rotating the valve core housing 50 and the valve core 82 relatively to the valve body 40 and about their common axis.

It is to be observed that the fit between the rib 116 and the groove 118 is sufficiently loose to avoid interfering with axial movement of the valve core 82 within the valve chamber 80 and with respect to the hydraulic cylinder 104 of the end plate 76. A widened portion 122 (Fig. 2) of the groove 118 is provided intermediate the ends of the same, thus establishing communication between the groove 118 and the hydraulic cylinder 104 in back of the valve core 82.

Means are provided for limiting the extent of rotational movement of the housing 50 and valve core 82 relative to the valve body 40 and for returning the housing and the valve core to an intermediate position when the handle 120 is released. For these purposes a pin 126 (Figs. 2 and 3) is rigidly secured to the lower part of the sleeve 51 and projects from the inner end thereof in a direction parallel to the common axis of the valve body 40 of the valve core housing 50. The pin 126 projects into a slot 128 formed in the base 30 of the valve body and extending in an arc centered about the common axis of the housing 50 and the valve body 40. Hence, the length of the arcuate slot 128 determines the extent of rotational movement of the housing 50 and valve core 82 relative to the valve body 40.

The pin 126 is engaged between two opposed springs 130 (Fig. 3) which cooperate to yieldably resist lateral movement of the pin in either direction from the intermediate position in which it is illustrated in Figs. 2 and 3. Each spring 130 is loosely mounted within a clearance hole 132 in the valve base 30. The holes 132 extend oppositely from the arcuate slot 128 to the side faces of the base 30. A tubular spring housing 134 is affixed to each side face of the valve base 30 in position for its bore to constitute a continuation of the associated hole 132 to accommodate the outer end of the associated spring 130. A plug 136 having a pin 138 projecting from its inner end into the core of the associated spring 130 is threaded into each spring housing 134 and is adjustable axially thereof to vary the degree of compression of the associated spring 130. Thus, the two springs 130 can be adjusted with respect to each other so that when the handle 120 is released the housing 50 and the valve core 82 will be returned to their intermediate positions illustrated in Figs. 1, 2, and 3. A locking plug 140 is threaded into the outer end of each spring housing 134 and can be tightened against the associated spring adjusting plug 136 to lock the latter in selected position of adjustment. Each spring 130 is provided with a pin 142 extending into the core of the spring at its inner end. Flanges 144 on the inner ends of the pins 142 bear against the pin 126 of the valve core 82 to transmit the pressure of the springs 130 to the valve core pin 126.

A longitudinally extending fluid supply duct 150 (Figs. 2, 3, and 5–7) is formed within the valve body 40 in coaxial relationship therewith and extends through the rectangular base 30 to communicate with the fluid supply duct 18 (Fig. 2) within the manifold block 12, it being understood that a suitable aperture is provided in the gasket 38 to establish communication between the ducts 18 and 150. Thus, the axially located duct 150 constitutes the fluid pressure supply duct of the valve 10. Two ducts 152 and 154 (Figs. 2, 3, and 5–7) are formed in the upper part of the cylindrical valve body 40 and the rectangular valve base 30 extending parallel to the axis thereof and spaced from each other equal distances on opposite sides of the vertical plane that includes the axis of the valve body as clearly shown in Figs. 3, 5, 6, and 7. The ducts 152 and 154 communicate at their inner ends with laterally extending holes 156 (Fig. 1) and 158 (Fig. 2), respectively, which are provided with female threads or other suitable means for connecting fluid conduits (not shown) thereto. Inasmuch as the ducts 152 and 154 are intended to be connected by such conduits to the opposite ends of a double acting hydraulic ram, the two ducts 152 and 154 will hereinafter be termed the "working ducts." An exhaust duct 160 (Figs. 2, 3, and 5–7) is provided in the cylindrical valve body 40 and rectangular valve base 30 below and parallel to the fluid supply duct 150 and communicating at its inner end with a downwardly facing hole 162 (Figs. 2 and 3) provided with female threads or other suitable means for connecting a discharge conduit (not shown) thereto whereby hydraulic fluid exhausted through the valve 10 can be returned to a suitable reservoir or sump (not shown). The three ducts 152, 154, and 160 are at equal radial distances from the fluid supply duct 150 as clearly shown in Figs. 3, 5, 6, and 7. Each of the ducts 150, 152, 154, and 160 terminates in a valve port in the flat end face 42 of the valve body 40.

As best shown in Figs. 4–7, fluid passages 170 and 172, respectively, are formed in the face of the resilient disc 88 of the valve core 82 that engages the flat end surface 42 of the valve body 40. The passage 170 is in the form of a radially extending channel so disposed that its inner end registers with the fluid supply duct 150 and its outer end is adapted to be selectively registered with either of the working ducts 152 and 154. This is accomplished by rotating the valve core 82 to one or the other of its two extremes of rotational movement as illustrated in Figs. 6 and 7, respectively. However, when the valve core 82 is in its intermediate position the radial passage 170 does not register with either of the working ducts 152, 154 (Fig. 5).

The fluid passage 172 is in the form of an arcuate channel centered about the inner end of the radial passage 170 at such radial distance therefrom that the passage 172 registers with the exhaust duct 160. Moreover, the angular extent or length of the arcuate passage 172 is such that when the valve core 82 is turned to the limit of its rotational movement in one direction the arcuate passage 172 establishes communication between the exhaust passage 160 and the working duct 152, as illustrated in Fig. 7, and when the valve core 82 is turned to the other limit of its rotational movement the arcuate passage 172 establishes communication between the exhaust duct 160 and the other working duct 154, as shown in Fig. 6.

Means are provided for causing the resilient disc 88 of the valve core 82 to be pressed against the flat end face 42 of the valve body 40 with pressure that varies in accordance with variation in the hydrostatic pressure of the fluid handled by the valve 10. In this manner, regardless of the hydrostatic pressure, the flat face of the resilient disc 88 is adapted to establish a sliding fluid tight seal with the flat end face 42 of the valve body 40 so as to prevent flow between any of the ducts 150, 152, 154, and 160 that are not interconnected by either of the passages 170 or 172 of the valve core. However, the pressure of the valve core 82 against the end face 42 is decreased when the hydrostatic pressure decreases, thus minimizing wear of the parts and the effort required to operate the valve 10 when heavy pressure between valve core and valve seat end surface 42 is not needed to prevent leakage between any two unconnected ducts. With this object in view, an axial duct 180 (Figs. 2 and 4) is formed through the valve core 82 thus establishing communication between the radial passage 170 and the hereinbefore mentioned diametrically extending groove 118 (Fig. 2) that is provided in the bottom of the hydraulic cylinder 104. Inasmuch as the groove 118 constantly communicates through its widened part 122 with the hydraulic cylinder 104, a permanent passageway is provided that imposes upon the end of the valve body 84 the same hydrostatic pressure as that prevailing within the fluid supply duct 150. However, since the area of the end of the portion 84 of the valve core 82 which is thus exposed to the pressure of the fluid handled by the valve is considerably less than the cross-sectional area of the valve chamber 80, the physical pressure that the valve core exerts against the flat end face 42 of the valve body 40 is considerably less than would be the case in the absence of the plunger and cylinder arrangement 84, 104 whereby the valve core 82 is associated with the end plate 76.

Two bleeder holes 182 are provided in the valve core 82 extending from the bottom of the arcuate fluid passage 172 through the remaining thickness of the resilient disc 88 and through the flange 86. The bleeder holes 182 establish communication between the arcuate passage 172 and that part of the valve chamber 80 within which the spring 110 is disposed.

In describing the operation of the valve 10, it will be assumed that the fluid supply duct 150 is connected to a source of hydraulic fluid under suitable pressure, the working ducts 152 and 154 are connected to opposite ends of a double-acting hydraulic ram (not shown), and the exhaust duct 160 is connected to a suitable reservoir, sump or other means for receiving waste fluid discharged by the hydraulic ram through the valve 10. When the handle 120 is disposed vertically as illustrated, the valve core 82 will be positioned with its radial fluid passage 170 likewise disposed vertically (Fig. 5) and out of communication with either of the working ducts 152 and 154. Consequently, both working ducts 152 and 154 will be blanked off by the solid part of the resilient disc 88 and fluid will not be permitted to flow from either end of the hydraulic ram. Therefore, the ram will be locked in the position which it then occupies.

Since the fluid duct 180 of the valve core 82 is arranged coaxially of the same, it always registers with the fluid supply duct 150. Therefore, regardless of the positions to which the handle 120 and the valve core 82 are moved, full fluid pressure is imposed upon the back of the valve core 82, pressing the resilient disc 88 against the flat valve seat surface 42 with sufficient pressure to maintain a sliding fluid-tight seal therewith, and thus prevent leakage between any of the ducts 150, 152, 154, and 160 that are not interconnected by one or the other of the passages 170 or 172. This follows as a consequence of the fact that the area at the bottom of the radial passage 170 against which full fluid pressure is exerted urging the valve core 82 away from the valve seat 42 is considerably less than the area of the back end of the valve core 82, which is likewise exposed to full fluid pressure.

By turning the sleeve 51 counterclockwise as viewed in Fig. 1, the valve core 82 can be turned to the position illustrated in Fig. 6 wherein the radial fluid passage 170 establishes communication between the fluid supply duct 150 and the working duct 152, thus imposing full fluid pressure upon one end of the hydraulic ram. Simultaneously, the other working duct 154 is connected to the exhaust duct 160 by the arcuate fluid passage 172, thus relieving pressure within the other end of the ram and causing the ram to be actuated in one direction. As long as the handle 120 is permitted to remain in the position wherein the valve core 82 occupies this described position, the ram will be urged to move in said one direction. However, upon return of the handle 120 to its intermediate position either manually or by simply releasing the handle 120 and permitting the spring 130 that has been compressed to return the parts to their intermediate positions, the valve core 82 will be returned to the position illustrated in Fig. 5 wherein both working ducts 152 and 154 are blanked off and the ram will be locked in its then attained position.

By swinging the handle 120 clockwise as viewed in Fig. 1, the valve core 82 will be moved to the position illustrated in Fig. 7, wherein the radial passage 170 establishes communication between the fluid supply duct 150 and the working duct 154, thus imposing full fluid pressure upon the other end of the ram. Simultaneously, the working duct 152 will be connected to the exhaust duct 160 by the arcuate passage 172, permitting escape of fluid from the other end of the ram and causing the ram to be actuated in the opposite direction. Again, upon return of the handle 120 to its vertical position either manually or by spring action, both working ducts 152 and 154 will be blanked off and the ram will be locked in its then attained position.

The bleeder holes 182 assure equalization of pressures behind the flange 86 of the valve core and within the exhaust duct 160. The importance of this feature lies in the fact that in the event that some back pressure exists within the exhaust duct 160, the same pressure will be maintained upon the back of the flange 86 and the pressure within the exhaust duct will have no tendency to unseat the resilient disc 88 from sealing engagement with the flat valve seat surface 42. This is a further feature of the valve 10 that operates to prevent leakage between any of the ducts 150, 152, 154, and 160 that are not interconnected by either the radial passage 170 or the arcuate passage 172 of the valve core 82.

It is to be observed that the mounting of the cylindrical valve core housing 50 upon the valve body 40 by means of the ball bearings 52 minimizes frictional resistance to rotation of the housing 50 relative to the valve body and thereby makes for easier operation. This factor is of importance when the valve 10 is used to control hydraulically-operated apparatus requiring constant or frequent manipulation, such as a fire monitor or a giant used in hydraulic mining. Constant or frequent manipulation of the valves that are required in the operation of such apparatus has been found to be the source of excessive operator fatigue when the control valve does not operate easily.

The tandem mounting of two valves 10 and 10a, respectively, illustrated in Fig. 1 has been found to afford great convenience when the valves are used to control a hydraulic mining giant because one valve, say the valve 10, can be connected to the hydraulic ram that effects horizontal aiming of the nozzle of the giant, whereas the other valve 10a can be employed to effect vertical aiming of the giant nozzle.

Figs. 8 and 9 illustrate a slightly modified form of the hydraulic valve of the present invention. This valve 200 comprises a cylindrical valve body 202 projecting from a rectangular base 204 and carrying a cylindrical valve core housing 206 which is rotatably mounted thereon by ball bearings 208 as in the case of the valve 10. The valve core housing 206 is closed at its outer end by an end plate 210 carrying a radially extending operating handle 212. The parts of the valve 200 so far described are similar to the corresponding parts of the valve 10, differing therefrom only in the fact that the inner face of the end plate 210 is flat, i.e. is not provided with a hydraulic cylinder as in the case of the valve 10, and the cylindrical valve core housing 206 is somewhat shorter than the valve core housing 50 of the valve 10.

The valve core 214 of the valve 200 is in the form of a flat disc 220 having a resilient disc 222 of rubber or rubber-like material bonded to one face thereof. The discs 220 and 222 are of such diameter that they establish a substantially fluid tight sliding fit within the valve chamber 223 defined by the bore of the cylindrical valve core housing 206 and thus operate in the manner of a plunger reciprocable within a hydraulic cylinder. The valve core 214 is connected to the valve core housing 206 for rotation therewith through the expedient of a plurality of pins 224 rigid with the disc 220 and projecting therefrom parallel to the common axis of the valve body 202 and valve core housing 206 but spaced radially therefrom. Each of the pins 224 seats loosely within a socket 226 formed in the inner face of the end plate 210, thus keying the valve core 214 to the end plate 210 and to the valve core housing 206 for rotation therewith without restricting freedom of axial movement of the valve core 214 within the valve chamber 223. Each of the keying pins 224 carries a coil spring 228 that is under compression between the end plate 210 and the disc 220 of the valve core 214. Thus, the several springs 228 urge the valve core 214 toward the body 202 of the valve 200 and maintain sliding engagement between the flat face of the resilient disc 222 and the flat valve seat face that is provided by the end 230 of the valve body 202.

The arrangement of the fluid supply duct 240, the two working ducts 242 (only one shown), and the exhaust duct 244 is identical with the arrangement of the corresponding ducts in the valve 10. However, arrangement of the passages within the valve core 214 is slightly different from that of the corresponding passages of the valve core 82. In the valve core 214 a central or axial duct 246 constantly maintains communication between the fluid supply duct 240 and the valve chamber 223 behind the valve core 214. This causes full fluid pressure to be imposed upon the rear face of the valve core 214. Another duct 248 likewise extends clear through the valve core 214 in position so spaced radially from the axial duct 246 that the second duct 248 is adapted to be selectively registered with either of the two working ducts 242 of the valve body by swinging the handle 212 to one extreme or the other, respectively, of its rotary movement. The possible extent of such rotary movement is determined by the length of an arcuate slot 250 in the base 204 of the valve and a pin 252 carried by the valve core housing 206 and movable within the slot 250. The slot 250 and pin 252 are similar to the slot 128 and pin 126, respectively, of the valve 10 previously described and may be similarly provided with return springs (not shown). The valve core 214 is further provided with an arcuate passage 254 in the form of a channel similar to the arcuate channel 172 of the first-described form of the valve of the invention.

Operation of the valve 200 is similar to that of the valve 10. When the handle 212 is swung to the limit of its movement in one direction, the duct 248 registers with one of the two working ducts 242 of the valve body, thus establishing communication between the fluid supply duct 240 and the selected working duct 242. In this instance, however, such communication is established through the valve chamber 223 in back of the valve core 214 rather than through a channel formed only in the inner or working face of the resilient disc 222. At the same time, communication is established by the arcuate passage 254 between the exhaust duct 244 and the other working duct 242, causing the ram (not shown) with which the valve 200 is associated to be operated in one direction. Operation of the ram in the opposite direction is caused by swinging the handle 212 in the opposite direction, reversing the relationship of the duct 248 and the passage 254 with respect to the two working ducts 242.

While two embodiments of the present invention have been shown and described, it will be understood that the construction of the valve of the invention is capable of further modification and variation without departing from the principles of the invention and that the scope of the invention should be limited only by the scope and proper interpretation of the claims appended hereto.

The invention having thus been described, that which is believed to be new and for which protection by Letters Patent is desired is:

1. A rotary valve comprising a cylindrical valve body terminating in an end surface and having a fluid supply duct formed coaxially therein and a working fluid duct spaced radially from the supply duct, each of said ducts terminating in said end surface, a cylindrical sleeve encompassing the valve body and projecting axially beyond the body to present a valve chamber within the sleeve, anti-friction means rotatably mounting the sleeve on the body and retaining the sleeve and body against axial movement with respect to each other, means closing the projecting end of the sleeve, a valve core floating within the valve chamber in the sleeve and having an axial duct therethrough to impose the hydrostatic pressure prevailing within said fluid supply duct upon the end of the valve core remote from said body to press the valve core into sliding, fluid sealing engagement with said end surface of the valve body, said valve core having a fluid passage therein in position to interconnect said ducts when the valve core is in a certain position of rotational adjustment relative to the valve body, means connecting the valve core to the sleeve for rotation therewith, and means for rotating the sleeve.

2. A rotary valve comprising a cylindrical valve body terminating in an end surface and having a fluid supply duct formed coaxially therein and a working fluid duct spaced radially from the supply duct, each of said ducts terminating in said end surface, a cylindrical sleeve encompassing the valve body and projecting axially beyond the body to present a valve chamber within the sleeve, means closing the projecting end of the sleeve, means defining registering ball bearing races in the sleeve and in the valve body, a plurality of ball bearings in the registering races rotatably mounting the sleeve on the body and retaining the sleeve and body against axial movement with respect to each other, a valve core floating within said valve chamber and having an axial duct therethrough to impose pressure prevailing within said fluid supply duct upon the end of the valve core remote from said body to press the valve core into sliding, fluid sealing engagement with said end surface of the valve body, said valve core having a fluid passage therein in position to interconnect said ducts when the valve core is in a certain position of rotational adjustment relative to the valve body, means connecting the valve core to the sleeve for rotation therewith, and means for rotating the sleeve.

3. A rotary valve comprising a body member having an end face with valve ports including an outlet port, a valve member associated with and rotatable relative to said body member, a valve core rotatable with and axially movable relative to said valve member and having a face engaging said end face of the body member and further having fluid conducting passage means provided therein whereby communication may be established between selective ones of said ports upon rotary movement of said valve core relative to said body member, said valve core defining with said valve member a chamber having communicating means with said outlet port in all rotative positions of said valve core, said valve core having a portion in such relation to said chamber as to tend to retain said face of the valve core against said end face of said body member upon pressure build up in said outlet port, and means operative independent of said pressure build up for urging said valve core face into sealing engagement with the end face of said body member.

4. A rotary valve as set forth in claim 3 in which said chamber is further defined in part by a surface on said valve core generally parallel to said valve core face, and the communicating means between said outlet port and said chamber includes a bleeder passage extending between said fluid passage means and said chamber.

References Cited in the file of this patent

UNITED STATES PATENTS

| | | |
|---|---|---|
| 905,605 | Tarn | Dec. 1, 1908 |
| 1,030,229 | Cheney | June 18, 1912 |
| 1,482,463 | Emrick | Feb. 5, 1924 |
| 1,960,515 | Shield | May 29, 1934 |
| 1,971,187 | Jacobson et al. | Aug. 21, 1934 |
| 2,076,321 | Pick | Apr. 6, 1937 |
| 2,115,950 | Gurries et al. | May 3, 1938 |
| 2,202,961 | Parker | June 4, 1940 |
| 2,344,913 | Ager | Mar. 21, 1944 |
| 2,564,444 | Parsons | Aug. 14, 1951 |
| 2,688,981 | Greer et al. | Sept. 14, 1954 |
| 2,696,805 | Krohm | Dec. 14, 1954 |

FOREIGN PATENTS

| | | |
|---|---|---|
| 149,255 | Sweden | Mar. 15, 1955 |